Patented Nov. 7, 1939

2,178,760

UNITED STATES PATENT OFFICE 2,178,760

PROCESS FOR THE DEHYDROGENATION OF HYDROXY CARBOXYLIC ACIDS AND ESTERS THEREOF

Wilbur Arthur Lazier, Wilmington, Del., assignor to E. I. du Pont de Nemours & Company, Wilmington, Del., a corporation of Delaware No Drawing. Application February 14, 1935, Serial No. 6,487

21 Claims. (Cl. 260—411)

This invention relates broadly to processes for the removal of hydrogen from hydroxy acids and/or esters and/or salts of such acids, and the production thereby of ketonic acids and/or esters and/or salts of such acids. More specifically, it relates to the dehydrogenation of hydroxy stearic esters to produce ketostearic esters.

Many compounds of the general class of keto-acids and ketoesters are known. For example, several ketostearic acids or their esters having the ketone group attached to carbon atoms in the 2 to 11 positions are described in the literature. However, 12-ketostearin and certain other keto esters disclosed in the examples have not, so far as I am aware, been known or prepared before.

An object of this invention is to provide a process whereby new compositions of matter may be obtained. A further object is the production of ketonic esters and/or acids and/or salts from hydroxy acids and/or esters and/or salts by processes of catalytic dehydrogenation. A still further object is the production of ketostearic esters from hydroxy stearic esters by dehydrogenation. A specific object is the employment of highly efficient dehydrogenation catalysts in the processes of dehydrogenation mentioned above.

These objects are accomplished by the following invention, a detailed description of which is given below. In its general aspects the invention comprises bringing a hydroxy acid or ester or salt having the hydroxyl substituent at least 2 carbons removed from the carboxyl group, into liquid contact with a finely divided highly efficient dehydrogenating catalyst and heating the mixture, at suitable temperatures, preferably with stirring. Hydrogen is evolved with the conversion of the carbinol group of the compound undergoing dehydrogenation into a keto group. A more detailed description of the invention is contained in the following examples:

Example I

Three thousand grams of hydrogenated castor oil (12-hydroxy stearin) was heated with 300 g. of nickel-on-kieselguhr catalyst at 184 to 273° C. for 6 hours with stirring. Hydrogen was evolved to an extent which indicated a 79% conversion of the hydrogenated castor oil. However, on separation of the reaction products by filtration and crystallization from acetone, there was obtained a 65% yield of 12-ketostearin. The 12-ketostearin was a white powder melting at 80° to 82° C. and had an acetyl value of less than 5.0. It was slightly soluble in acetone, ethyl acetate, and carbon tetrachloride, and dissolved in ethyl alcohol to the extent of about 3 g. per 100 cc.

Example II

Under the conditions described in Example I, except that a copper-cadmium-chromite catalyst containing copper and cadmium in the mol-ratio of 9:1 was used in place of the nickel catalyst, a 15.5% conversion to ketostearin was obtained.

Example III

In still another run carried out under the conditions described in Example I, a mixed chromite catalyst was employed containing cobalt, nickel and cadmium in the mol-ratio of 2:2:1. With this catalyst 26.3% of the 12-hydroxy stearin was converted to ketostearin.

Example IV

Ten grams of reduced nickel-on-kieselguhr catalyst was heated with 100 g. of butyl 12-hydroxy stearate with vigorous stirring at a temperature of 211° to 304° C. for 8 hours. Hydrogen was evolved in an amount indicating a 90% dehydrogenation of the hydroxyl group. However, upon distillation a 70% yield of butyl 12-keto stearate was obtained. The product was a white solid melting slightly above room temperature and boiling at 187° to 190° C. at 2 mm.

Example V

Under the conditions described in Example I, ethyl 12-hydroxy stearate was dehydrogenated in the presence of a nickel-on-kieselguhr catalyst at 195° to 284° C. and gave a 60% yield of ethyl 12-ketostearate. This product was also a white solid melting at about room temperature and boiling at 180° to 184° C. at 1 mm. pressure. It was very soluble in organic solvents and insoluble in water.

Example VI

Ten grams of nickel-on-kieselguhr catalyst was added to 100 g. of ethyl ricinoleate and the mixture was heated at 228° to 312° C. for 8 hours with vigorous stirring. The amount of hydrogen evolved indicated an 82% conversion of the ethyl ricinoleate but as considerable dehydration occurred (65 to 70%), analysis of the product showed the presence of approximately 20% of ethyl-12-keto-oleate, which was an oil at room temperature.

Example VII

A nickel chromite catalyst was prepared as follows: 1750 g. of nickel nitrate was dissolved in 3 liters of water and mixed with a solution of 750 g. of ammonium bichromate in an equal volume of water. The mixed solution was heated to 90° to 100° C. for 30 minutes with stirring, after which the brick-red precipitate of nickel ammonium chromate was washed by decantation and dried. This compound was ignited at 400° C. to drive off the ammonia and part of the oxygen, leaving as the residue a nickel chromite composition which was then further reduced with hydrogen for 12 hours at 500° C.

Ten grams of the catalyst thus prepared and containing 25 to 28% of elementary nickel was heated with 100 g. of castor oil with energetic stirring at a temperature of 278° to 320° C. Hydrogen was evolved, leaving behind an oil which was found by analysis to contain only 42% of the original hydroxyl value. Since the increase in unsaturation as a result of dehydration amounted to only 18%, it was concluded that about 40% of the oil had reacted through dehydrogenation to form the corresponding unsaturated ketonic glyceride.

*Example VIII*

Using nickel-on-kieselguhr as a catalyst in place of the nickel chromite of Example VII, a 25% conversion of castor oil to ketonic esters was effected.

*Example IX*

One hundred fifty grams of hydrogenated castor oil, together with 50 g. of benzene and 15 g. of nickel-on-kieselguhr catalyst, was placed in a shaking autoclave and heated at 250° C. for 5 hours. The amount of cyclohexane recovered from the reaction product indicated that 63% of the hydrogenated castor oil had been converted to 12-keto stearin. In addition, a considerable hydrogen pressure developed in the reaction tube.

Although in the above examples there have been indicated certain definite conditions of temperature, amounts of material, duration of the reaction, etc., it is to be understood that these values may be varied somewhat within the scope of this invention since the particular conditions of operation are governed by the materials treated and the catalyst selected for a given dehydrogenation. The processes described in this invention are operative in the temperature range from 100 to 350° C. It is preferred to operate the processes disclosed in the above examples at atmospheric pressure; however, it should be noted that pressures below atmospheric tend to increase the dehydrogenation process, whereas pressures above atmospheric tend to inhibit that process.

A wide variety of catalysts may be used to effect the dehydrogenation reaction of the present invention. I may use any of the well-known hydrogenating and dehydrogenating metals such as nickel, cobalt, iron, copper, cadmium, zinc, tin, platinum, palladium, silver, etc. Powdered ferrous metal catalysts are preferred, however, and may be prepared for this purpose by precipitating a chromate, carbonate, or hydroxide of the metal followed by reduction with hydrogen, although there is no necessity for limitation to these methods. In the case of some dehydrogenating metals which form rather easily reducible oxides, such as copper and silver, the prereduction step may be omitted. The dehydrogenating metals are preferably employed as catalysts in conjunction with inert supports such as kieselguhr, pumice, active carbon, silica gel, and the like.

Finely divided metallic nickel is the preferred catalyst and may be prepared in an active form by a number of alternative methods. The preferred method consists of reduction with hydrogen of oxygen-containing nickel compounds such as the carbonate, oxide, hydroxide, or salt of an inorganic acid such as chromic acid, vanadic acid, tungstic acid, and the like. Suitable temperatures for the reduction of such nickel compositions are found in the range 250° to 500° C. Ammonia or other reducing agents may be used. When reducing chromates either by heat alone or together with hydrogen, chromites are formed which serve as the support for the catalytic dehydrogenating metal.

Compounds which may be successfully dehydrogenated by the processes of my invention are those in which the hydroxyl group is at least two carbon atoms removed from the carboxyl group. Compounds in which the hydroxyl group is attached to the carbon atom adjoining the carboxyl group are otherwise decomposed when attempts are made to dehydrogenate them. The process, therefore, applies to hydroxy open-chain monobasic acids having five or more carbon atoms and having the secondary hydroxy group separated from the carboxyl by at least two carbon atoms, such as 4-hydroxy pentanoic acid and its esters which on dehydrogenation are converted to levulinic acid and its esters. The esters of the above mentioned acids may also be treated by the processes of this invention. Suitable alcohol components of the hydroxy esters include monohydric alcohols such as ethyl, butyl, stearyl, etc., and polyhydric alcohols such as glycols, glycerol, sorbitol, etc. The glycol esters are used preferably in the form of the diesters and the glycerol esters in the form of the triesters.

The hydroxy acids suitable for use in the processes of this invention are such as occur naturally in animal and vegetable products, the outstanding example being ricinoleic acid and its derivatives. There may also be used synthetic hydroxy acids and their esters such as, for example those formed by the hydroxylation of unsaturated oils and oil acids. These are exemplified by 9,10-dihydroxystearic acid formed by the hydroxylation of oleic acid; also by 8,9-dihydroxyphysetoleic acid formed by the hydroxylation of physetoleic acid obtained by the hydrolysis of sperm oil. I may also use products obtainable by the hydrogenation of the unsaturated bonds of naturally occurring hydroxy acids or an ester thereof, as exemplified by Examples I to V.

My invention has been described with particular reference to the application of catalytic dehydrogenation to certain hydroxy acids and their esters. Although this is the preferred form, the invention is applicable not only to these hydroxy acids, but broadly to the carboxylates of these acids. By the term "carboxylates" I mean to include not only the esters and salts but the hydroxy acids themselves. The invention may therefore be said to cover the dehydrogenation of a compound of the type formula: RCOOX, where R is a hydroxy-substituted open-chain hydrocarbon of at least 4 carbon atoms in which the hydroxy group is attached to a non-terminal carbon atom separated from the carboxyl group by at least 2 other carbon atoms, and where X may be either hydrogen, a metal, an alkyl group, or an aryl group.

The processes of this invention are particularly suitable for the dehydrogenation of 12-hydroxy stearic acid and the esters of this compound to produce the corresponding keto compounds.

It will be apparent from Example IX that I may employ a hydrogen acceptor to receive the hydrogen evolved and so operate the process in a closed reaction vessel. Other hydrogen acceptors than benzene may be similarly employed.

By means of this invention new and valuable keto compounds are produced by a process which is practical and efficient. These compounds may be used for such purposes as plasticizing agents for coating or molding compositions, wax substitutes, and wax emulsion components as, for example, in the manufacture of carbon paper, rubber softeners and dressings, components of cosmetic creams, and the like.

As many apparently widely different embodiments of this invention may be made without departing from the spirit and scope thereof, it is to be understood that I do not limit myself to the specific embodiments thereof except as defined in the appended patent claims.

I claim:

1. The process which comprises heating to a temperature between 100° and 350° C. a nickel catalyst prepared by the hydrogen reduction of an oxygen-containing nickel compound at a temperature within the range of 250° to 500° C. and a compound of the type formula: RCOOX, where R is a hydroxy substituted open-chain hydrocarbon of at least 4 carbon atoms in which the hydroxy groups are attached to non-terminal carbon atoms separated from the carboxyl group by at least 2 other carbon atoms, and where X is a member of the group consisting of hydrogen, a metal, an alkyl group, and an aryl group until the substantially theoretical amount of hydrogen to produce the corresponding ketonic compound is evolved.

2. The process in accordance with claim 1 characterized in that the catalyst is nickel supported on kieselguhr.

3. The process in accordance with claim 1 characterized in that the reaction is carried out in the presence of a liquid acceptor for hydrogen.

4. The process in accordance with claim 1 characterized in that the reaction is carried out in the presence of benzene.

5. The process in accordance with claim 1 characterized in that the compound being dehydrogenated is a hydroxy acid.

6. The process in accordance with claim 1 characterized in that the compound being dehydrogenated is a hydroxy acid and is a component of a naturally occurring ester.

7. The process in accordance with claim 1 characterized in that the compound being dehydrogenated is a hydroxy acid and is obtainable by the hydrogenation of the unsaturated bond of a hydroxy acid which is a component of a naturally occurring ester.

8. The process in accordance with claim 1 characterized in that the compound being dehydrogenated is a hydroxy ester and is obtainable by the hydroxylation of the unsaturated bond of an acid which is a component of a naturally occurring ester.

9. The process in accordance with claim 1 characterized in that the compound being dehydrogenated is an ester of a hydroxy acid.

10. The process in accordance with claim 1 characterized in that the compound being dehydrogenated is an ester of a hydroxy acid which is a component of a naturally occurring ester.

11. The process which comprises heating to a temperature between 100° and 350° C. a nickel catalyst prepared by the hydrogen reduction of an oxygen-containing nickel compound at a temperature within the range of 250° to 500° C. and supported on an inert porous carrier and an ester of a hydroxy acid which is obtainable by the hydroxylation of the unsaturated bond of an acid which is a component of a naturally occurring ester until the substantially theoretical amount of hydrogen to produce the corresponding ketonic compound is evolved.

12. The process which comprises heating a glyceride of a hydroxy open-chain monobasic acid of at least 5 carbon atoms in which the secondary hydroxyl group is separated from the carboxyl by at least two carbon atoms to a temperature between 100° and 350° C. while in contact with a nickel catalyst prepared by the hydrogen reduction of an oxygen-containing nickel compound at a temperature within the range of 250° to 500° C. and supported on an inert porous carrier until the substantially theoretical amount of hydrogen to produce the corresponding ketonic compound is evolved.

13. The process which comprises heating a compound selected from the group consisting of the hydroxy open-chain monobasic acids of 16 and 18 carbon atoms, in which the —OH group is attached to a non-terminal carbon atom which is separated from the carboxyl group by at least 2 carbon atoms, and the esters of such acids to a temperature between 100° and 350° C. while in contact with a nickel catalyst prepared by the hydrogen reduction of an oxygen-containing nickel compound at a temperature within the range of 250° to 500° C. and supported on an inert porous carrier until the substantially theoretical amount of hydrogen to produce the corresponding ketonic compound is evolved.

14. The process which comprises heating a hydroxy stearate in which the secondary hydroxyl group is separated from the carboxyl by at least two carbon atoms to a temperature between 100° and 350° C. while in contact with a nickel catalyst prepared by the hydrogen reduction of an oxygen-containing nickel compound at a temperature within the range of 250° to 500° C. and supported on an inert porous carrier until the substantially theoretical amount of hydrogen to produce the corresponding ketonic compound is evolved.

15. The process which comprises heating a 12-hydroxy stearate to a temperature between 100° and 350° C. while in contact with a nickel catalyst prepared by the hydrogen reduction of an oxygen-containing nickel compound at a temperature within the range of 250° to 500° C. and supported on an inert porous carrier until the substantially theoretical amount of hydrogen to produce the corresponding ketonic compound is evolved.

16. The process which comprises heating castor oil to a temperature between 100° and 350° C. while in contact with a nickel catalyst prepared by the hydrogen reduction of an oxygen-containing nickel compound at a temperature within the range of 250° to 500° C. and supported on an inert porous carrier until the substantially theoretical amount of hydrogen to produce the corresponding ketonic compound is evolved.

17. The process which comprises heating an ester of riconoleic acid to a temperature between 100° and 350° C. while in contact with a nickel catalyst prepared by the hydrogen reduction of an oxygen-containing nickel compound at a temperature within the range of 250° to 500° C. and supported on an inert porous carrier until the substantially theoretical amount of hydrogen to produce the corresponding ketonic compound is evolved.

18. The process which comprises heating a mixture of hydrogenated castor oil and a nickel catalyst prepared by the hydrogen reduction of an oxygen-containing nickel compound at a temperature within the range of 250° to 500° C. and supported on an inert porous carrier to a temperature of about 184° to 273° C. for about 6 hours and recovering the ketostearin formed.

19. The process which comprises heating a mixture of an alkyl hydroxy stearate and a nickel catalyst prepared by the hydrogen reduction of an oxygen-containing nickel compound at a temperature within the range of 250° to 500° C. and supported on an inert porous carrier to a temperature between 100° and 350° C. and recovering the alkyl ester of ketostearic acid formed.

20. The process which comprises heating a mixture of butyl 12-hydroxy stearate and a nickel catalyst prepared by the hydrogen reduction of an oxygen-containing nickel compound at a temperature within the range of 250° to 500° C. and supported on an inert porous carrier to a temperature of about 211° to 304° C. for about 8 hours and recovering the butyl ketostearate formed.

21. The process which comprises heating ethyl 12-hydroxy stearate and a nickel catalyst prepared by the hydrogen reduction of an oxygen-containing nickel compound at a temperature within the range of 250° to 500° C. and supported on an inert porous carrier to a temperature of about 195° to 284° C. for about 6 hours and recovering the ethyl 12-ketostearate formed.

WILBUR A. LAZIER.